(12) United States Patent
Chang et al.

(10) Patent No.: US 10,884,289 B2
(45) Date of Patent: Jan. 5, 2021

(54) BACKLIGHT MODULE

(71) Applicant: QISDA CORPORATION, Taoyuan (TW)

(72) Inventors: Wei-Jung Chang, Taoyuan (TW); Hsiao-Yun Chen, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/697,192

(22) Filed: Nov. 27, 2019

(65) Prior Publication Data

US 2020/0183229 A1 Jun. 11, 2020

(30) Foreign Application Priority Data

Dec. 5, 2018 (CN) .......................... 2018 1 1482258

(51) Int. Cl.
*G09F 13/04* (2006.01)
*G02F 1/13357* (2006.01)
*F21V 8/00* (2006.01)

(52) U.S. Cl.
CPC ..... *G02F 1/133605* (2013.01); *G02B 6/0018* (2013.01)

(58) Field of Classification Search
CPC . G02F 1/133605; G02F 6/0018; G02F 6/0043
USPC ........................................................ 362/97.1
See application file for complete search history.

(56) References Cited

U.S. PATENT DOCUMENTS 5,751,386 A * 5/1998 Kanda ................. G02B 6/0043
349/65

FOREIGN PATENT DOCUMENTS

| CN | 2463856 Y | 12/2001 |
|---|---|---|
| CN | 201548783 U | 8/2010 |
| CN | 201866617 U | 6/2011 |

* cited by examiner

*Primary Examiner* — Ali Alavi (57) ABSTRACT

A backlight module includes a light-guiding plate, a plurality of reflection spots, and a light source. The reflection spots are disposed on a back surface of the light-guiding plate. Light emitted by the light source enters the light-guiding plate through a light input side surface of the light-guiding plate, and is reflected by the reflection spots to emit out of the light-guiding plate through a light output surface of the light-guiding plate. The back surface includes a central portion and a fringe portion. The fringe portion extends along an edge of the back surface. The distribution density of the reflection spots on the fringe portion gradually decreases in a direction from the central portion toward the fringe portion.

25 Claims, 8 Drawing Sheets

BACKLIGHT MODULE

BACKGROUND OF THE INVENTION

1. Field of the Invention

The present invention relates to a backlight module, and more particularly to a backlight module with a light-guiding plate.

2. Description of the Prior Art

Many backlight modules use a light-guiding plate for guiding light to provide flat back light for but not limited to a liquid crystal panel. However, the back light provided by the backlight module is usually uneven at the circumference of the light-guiding plate. If the backlight module uses a quantum dot film, the light emitted out from the circumference of the backlight module is bluer or yellower, which influences image displaying of the liquid crystal panel. For this case, some backlight modules may be processed with compensation printing at portions of the reflector sheet of the backlight modules corresponding to the circumference of the light-guiding plate of the backlight modules. However, in practice, it probably induces insufficient or excessive compensation due to poor color-matching or assembly variations. In other words, this solution still cannot effectively solve the non-uniformity of the back light mentioned above.

SUMMARY OF THE INVENTION

An objective of the invention is to provide a backlight module, of which a light-guiding plate has reflection spots disposed on a fringe portion of a back surface thereof so as to eliminate or reduce the degree of the non-uniformity of back light provided by the backlight module at the fringe portion.

A backlight module according to the invention includes a light-guiding plate, a plurality of reflection spots, and a light source. The light-guiding plate has a light output surface, a back surface opposite to the light output surface, and a light input side surface between the light output surface and the back surface. The back surface includes a central portion and a first fringe portion. The back surface has a first edge and a second edge opposite to the first edge. The first fringe portion extends along the first edge. The light input side surface is adjacent to the second edge. The reflection spots are distributed over the central portion and the first fringe portion. A distribution density of the reflection spots on the first fringe portion gradually decreases in a direction from the central portion toward the first edge. The light source is disposed toward the light input side surface. Thereby, the reflection spots are distributed form the central portion to the first edge, so that the backlight module can provide more uniform back light.

Another backlight module according to the invention includes a light-guiding plate, a plurality of reflection spots, and a light source. The light-guiding plate has a light output surface, a back surface opposite to the light output surface, and a light input side surface between the light output surface and the back surface. The back surface includes a central portion and a third fringe portion. The back surface has a second edge and a third edge adjacent to the second edge. The third fringe portion extends along the third edge. The light input side surface is adjacent to the second edge. The reflection spots are distributed over the central portion and the third fringe portion. A distribution density of the reflection spots on the third fringe portion gradually decreases in a direction from the central portion toward the third edge. The light source is disposed toward the light input side surface. Similarly, the reflection spots are distributed form the central portion to the third edge, so that the backlight module can provide more uniform back light.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
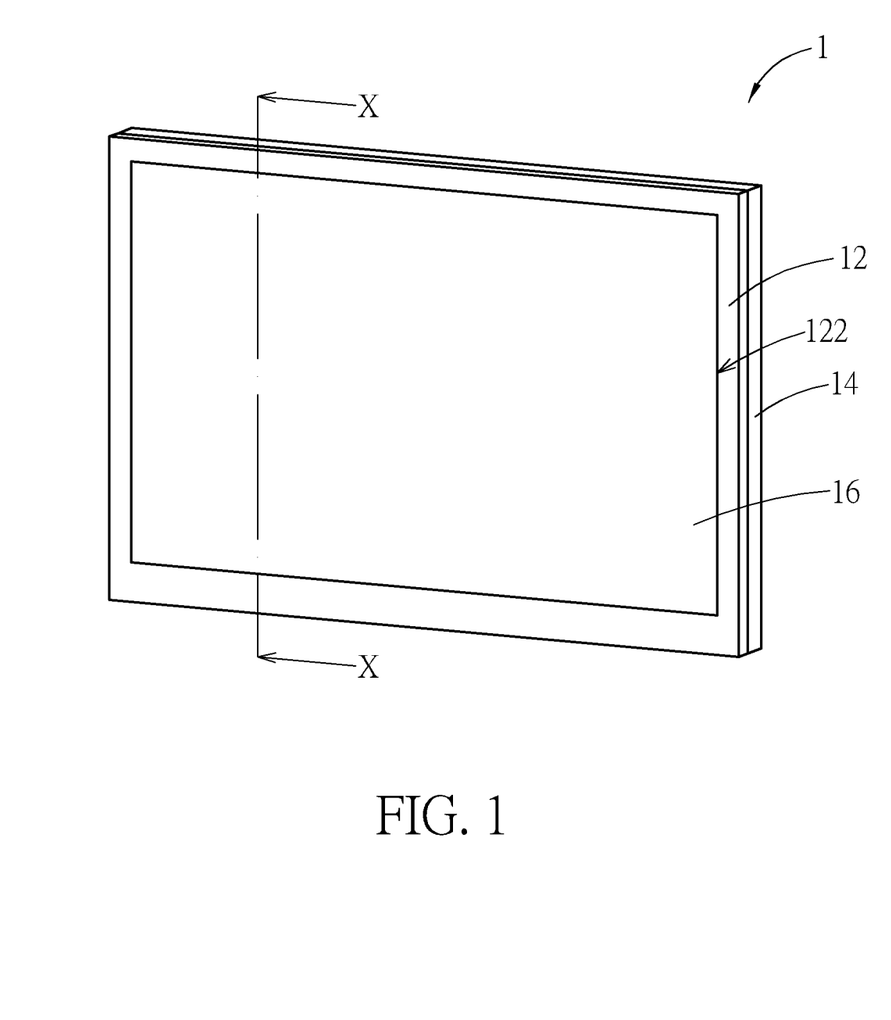
FIG. 1 is a schematic diagram illustrating a displaying device according to an embodiment.
Figure 2:
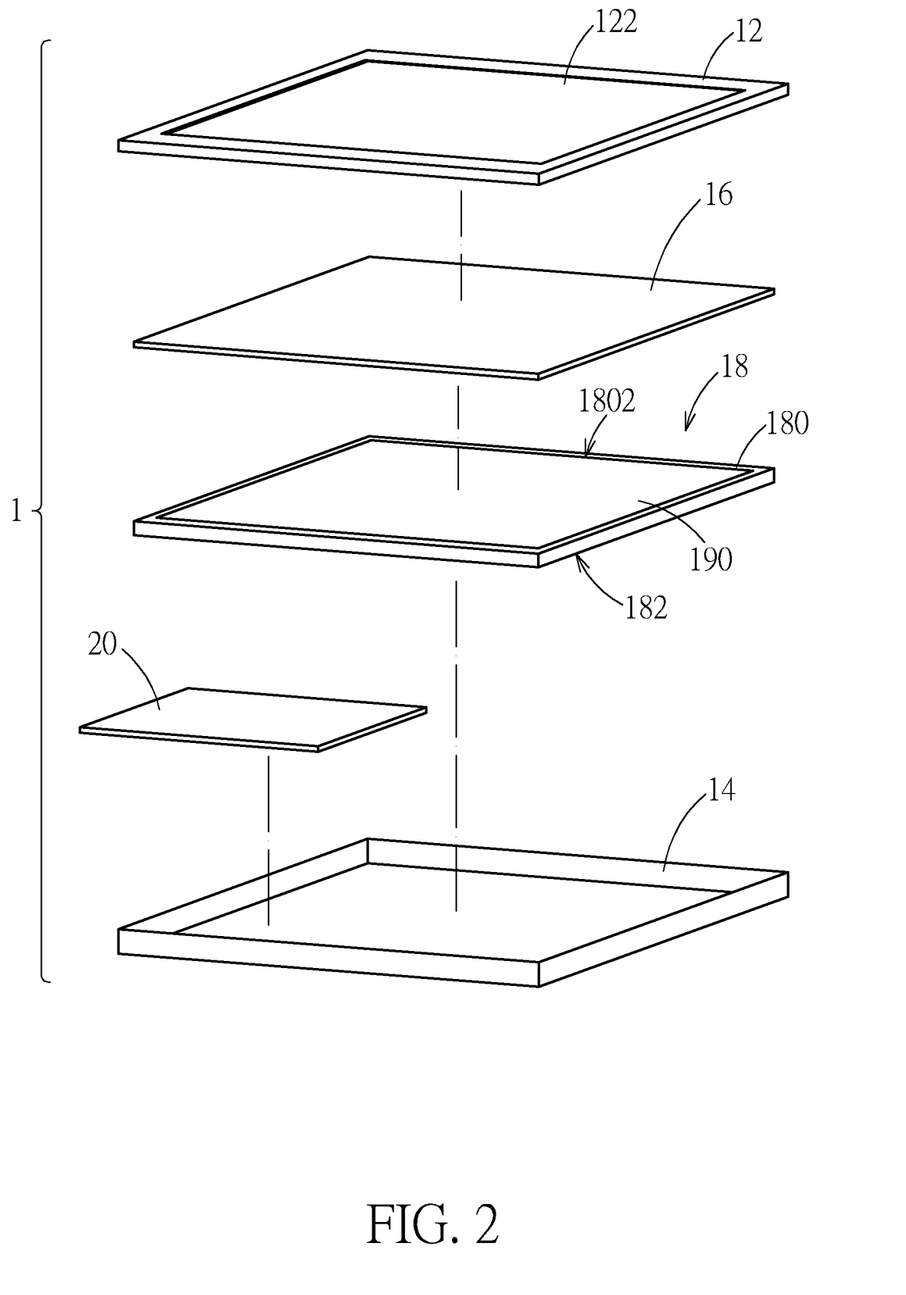
FIG. 2 is an exploded view of the displaying device in FIG.

Please refer to FIG. 1 and FIG. 2. A displaying device 1 according to an embodiment includes a front frame 12, a back cover 14, a liquid crystal panel 16, a backlight module 18, and a control module 20. The front frame 12 and the back cover 14 are engaged with each other to form an accommodating space for accommodating the other components. The front frame 12 has a window 122. The liquid crystal panel 16 is exposed through the window 122. The liquid crystal panel 16 can be realized by a liquid crystal panel of a common liquid crystal display in practice, which will not be described in addition. The backlight module 18 is disposed under the liquid crystal panel 16 for providing back light to the liquid crystal panel 16 to display images. The control module 20 is electrically connected to the liquid crystal panel 16 and the backlight module 18 for controlling the operation of the liquid crystal panel 16 and the backlight module 18. For simplification of the figures, the control module 20 is shown by a rectangle in FIG. 2, and the electrical connections of the control module 20 with the liquid crystal panel 16 and the backlight module 18 (e.g. by flexible flat cables) are also omitted. The control module 20 can be realized by a common liquid crystal display (including power control circuitry and signal control circuitry, which can be realized by one or more circuit boards) in practice, which will not be described in addition.

Figure 3:
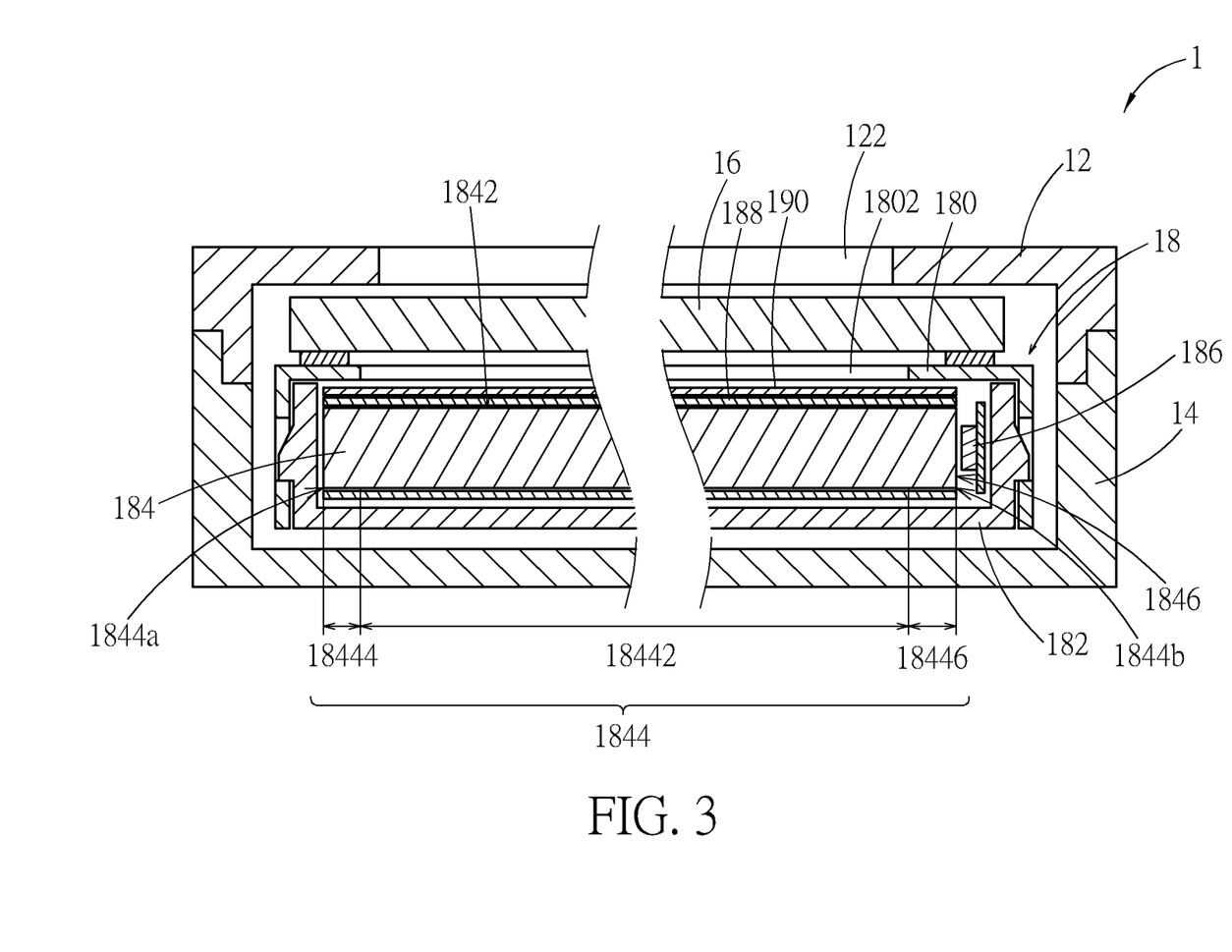
FIG. 3 is a sectional view of the displaying device along the line X-X in FIG. 1.
Figure 4:
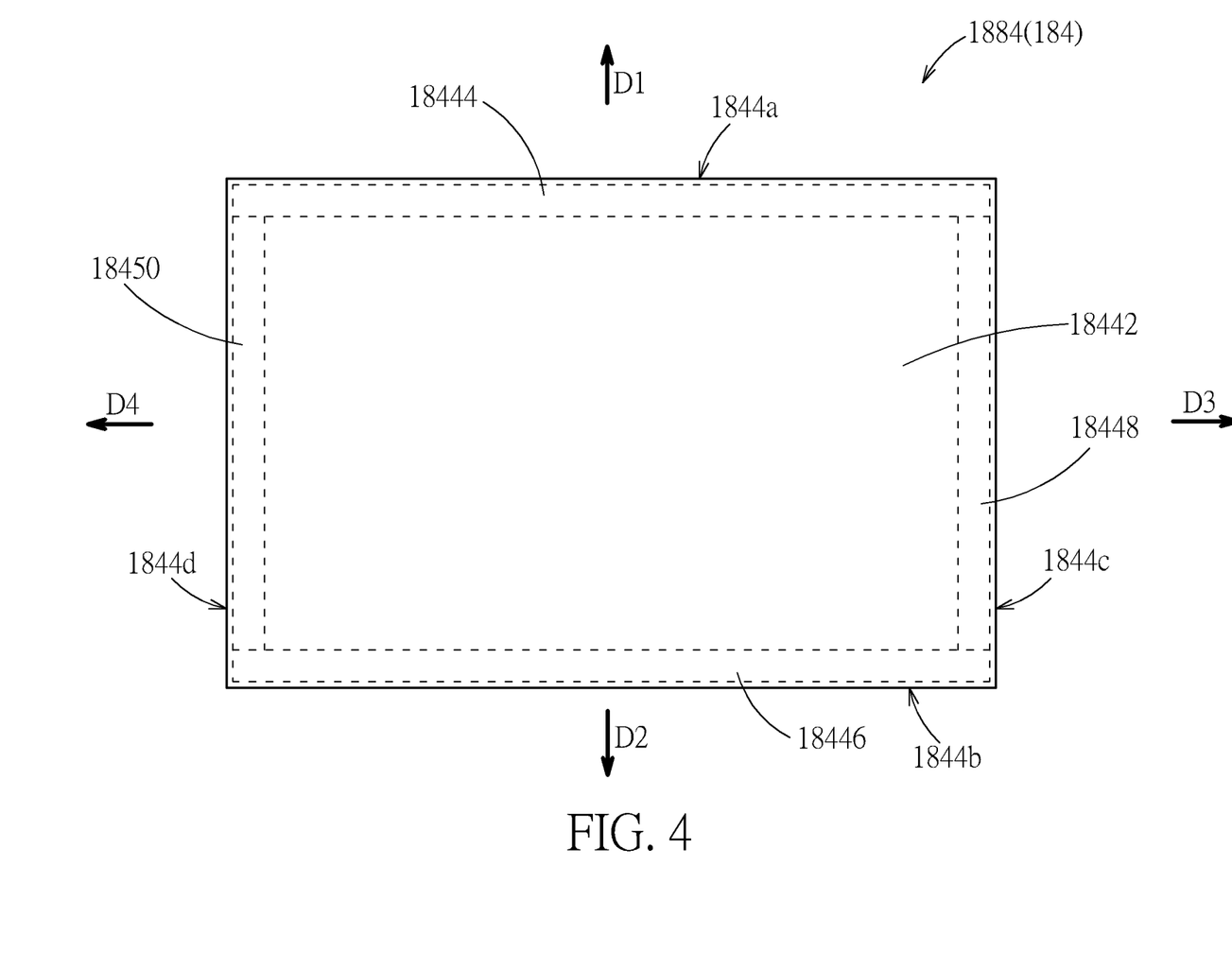
FIG. 4 is a front view of a back surface of a light-guiding plate of a backlight module in FIG. 2.

Please also refer to FIG. 3 and FIG. 4. In the embodiment, the backlight module 18 includes a rim 180, a bottom plate 182, a light-guiding plate 184, and a light source 186. The rim 180 and the bottom plate 182 are engaged with each other to form an accommodating space for accommodating the other components. The rim 180 forms a window 1802. The window 1802 can be slightly larger than the window 122 of the front frame 12. The light-guiding plate 184 has a light output surface 1842, a back surface 1844 opposite to the light output surface 1842, and a light input side surface 1846 between the light output surface 1842 and the back surface 1844. The light output surface 1842 is exposed through the window 1802. The back surface 1844 has a first edge 1844*a*, a second edge 1844*b* opposite to the first edge 1844*a*, a third edge 1844*c* adjacent to and between first edge 1844*a* and the second edge 1844*b*, and a fourth edge 1844*d* opposite to the third edge 1844*c*. The light input side surface 1846 is adjacent to the second edge 1844*b*. The back surface 1844 includes a central portion 18442, a first fringe portion 18444, a second fringe portion 18446, a third fringe portion 18448, and a fourth fringe portion 18450. The first to fourth fringe portions 18444, 18226, 18228 and 18450 (of which the areas are indicated by dashed lines) enclose the central portion 18442. The central portion 18442 is aligned with the window 1802 in practice; the fringe portions 18444, 18446, 18448 and 18450 are located under the rim 180 (i.e. under the front frame 12). The first fringe portion 18444, the second fringe portion 18446, the third fringe portion 18448, and the fourth fringe portion 18450 extend along the first edge 1844*a*, the second edge 1844*b*, the third edge 1844*c*, and the fourth edge 1844*d* respectively. The light source 186 (e.g. but not limited to a light bar including a plurality of light-emitting diodes, LED) is disposed toward the light input side surface 1846, so that light emitted by the light source 186 can enter the light-guiding plate 184 through the light input side surface 1846.

In the embodiment, the backlight module 18 also includes a plurality of reflection spots distributed over the back surface 1844, so that the light in the light-guiding plate 184 is reflected by the reflection spots to emit out of the light-guiding plate 184 through the light output surface 1842, so as to provide back light to the liquid crystal panel 16 to display images. In practice, the reflection spots can be realized by printing spots of reflection material on the back surface 1844, or by impressing tiny depressions on the back surface 1844, which will not be described in addition. Furthermore, for simplification of the figures, the reflection spots of the back surface 1844 are not shown in the figures. In the embodiment, the reflection spots are distributed over the whole back surface 1844; the distribution density of the reflection spots on the back surface 1844 is continuous. As a whole, the distribution density of the reflection spots on the back surface 1844 substantially gradually increases in a direction from the second edge 1844*b* toward the first edge 1844*a* (i.e. equivalent to a vertically upward direction D1 in FIG. 4). Furthermore, although the reflection spots are actually discretely disposed on the back surface 1844, the reflection spots are still dense relative to the whole back surface 1844; therefore, for simplification of the description, the reflection spots are regarded as being continuously disposed herein.

Figure 5:
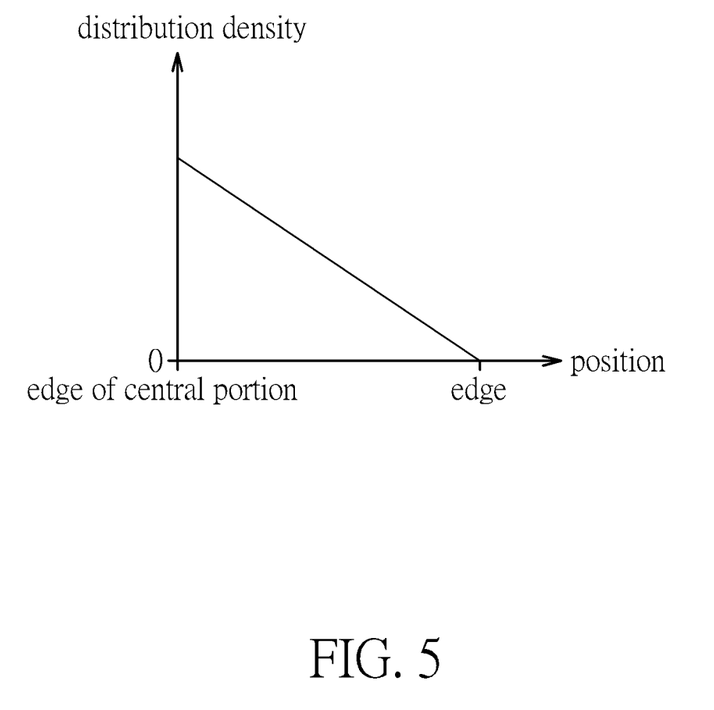
FIG. 5 is a schematic diagram illustrating the distribution density of reflection spots on a fringe portion.

Furthermore, in the embodiment, the distribution density of the reflection spots on the first fringe portion 18444 gradually decreases in a direction from the central portion 18442 toward the first edge 1844*a* (i.e. equivalent to the direction D1). The distribution density of the reflection spots on the second fringe portion 18446 gradually decreases in a direction from the central portion 18442 toward the second edge 1844*b* (i.e. equivalent to a vertically downward direction D2 in FIG. 4). The distribution density of the reflection spot on the third fringe portion 18448 gradually decreases in a direction from the central portion 18442 toward the third edge 1844*c* (i.e. equivalent to a horizontally rightward direction D3 in FIG. 4). The distribution density of the reflection spots on the fourth fringe portion 18450 gradually decreases in a direction from the central portion 18442 toward the fourth edge 1844*d* (i.e. equivalent to a horizontally leftward direction D4 in FIG. 4). From another aspect, the distribution density of the reflection spots on the central portion 18442 gradually increases in the direction D1. The reflection spots are gradually decreasingly distributed from the edges of the central portion 18442 toward all sides (i.e. in the four directions D1-D4); that is, the distribution densities of the reflection spots on the fringe portions 18444, 18446, 18448 and 18450 gradually decrease toward all sides respectively. The distribution densities of the reflection spots on the third fringe portion 18448 and the fourth fringe portion 18450 respectively also gradually increase in the direction D1. In practice, the distribution densities of the reflection spots on the edges 1844*a-d* respectively can be designed to be zero but not limited to zero, which can be schematically shown by FIG. 5. Furthermore, in FIG. 5, the variation of the distribution density is not limited to be linear. In practice, the variation of the distribution density can be adjusted or set according to the requirement of actual products, which will not be described in addition.

In addition, in the embodiment, the backlight module 18 also includes a wavelength conversion layer 188 and at least one optical film 190 (shown by a single structure for simplification of the figures). The wavelength conversion layer 188 is disposed above the light output surface 1842. The wavelength conversion layer 188 can convert part of the light into light in different wavelengths, so that the converted light and the non-converted light are mixed into required light. For example, the non-converted light is blue light, the converted light includes red light and greed light, and the converted light and the non-converted light are mixed into white light. In practice, the wavelength conversion layer 188 can be realized by a film within a plurality of quantum dots or fluorescent powder, e.g. a common quantum dot film; correspondingly, the light source 186 can be realized by a blue LED. The optical film 190 is disposed above the wavelength conversion layer 188 for enhancing the uniformity of the back light. However, it is not limited thereto in practice. For example, the light source 186 is realized by a white LED while the wavelength conversion layer 188 can be omitted.

In the embodiment, the reflection spots are also disposed over the whole fringe portions 18444, 18446, 18448 and 18450, so there will be light emitted out of the light-guiding plate 184 from the portions of the light output surface 1842 opposite to the rim 180. In other words, the back light provided by the backlight module 18 to the liquid crystal panel 16 includes the light from the portion of the light output surface 1842 corresponding to the central portion 18442, and also the light from the portions of the light output surface 1842 corresponding to the fringe portions 18444, 18446, 18448 and 18450. Therefore, the backlight module 18 can provide more uniform back light than the conventional backlight modules in the prior art, so that the brightness of images provided by the liquid crystal panel 16 corresponding to the inner edges of the window 122 of the front frame 12 is uniform. Furthermore, adjusting the distribution density of the reflection spots on the fringe portions 18444, 18446, 18448 and 18450 can reduce, or even eliminate a possible uneven phenomenon of the back light provided by the backlight module 18 at the circumference of the backlight module 18. In the embodiment, the backlight module 18 uses the wavelength conversion layer 188. The back light provided by the backlight module 18 corresponding to the inner edges of the window 122 of the front frame 12 will probably not be bluer or yellower to influence the images displayed by the liquid crystal panel 16.

Figure 6:
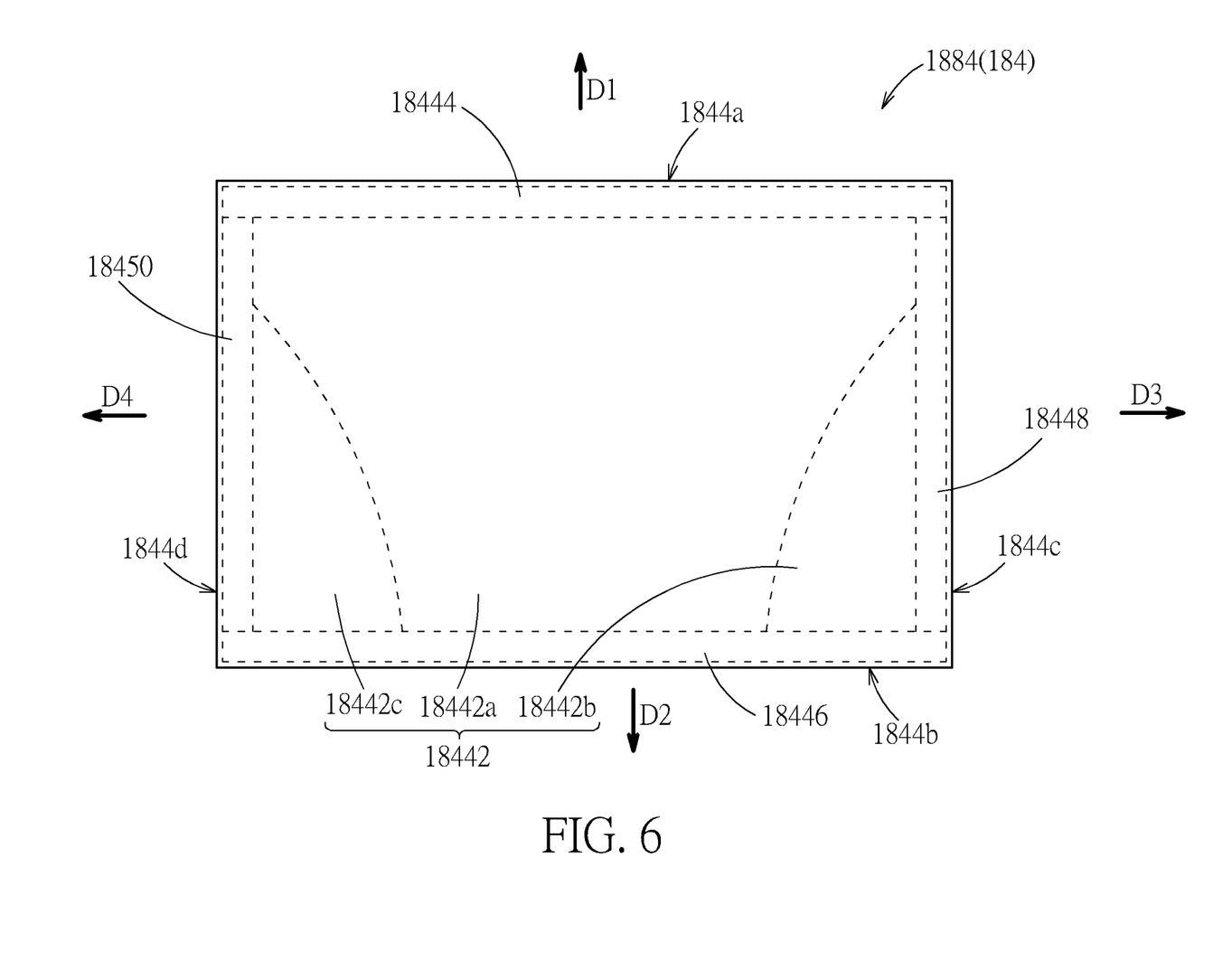
FIG. 6 is a front view of a central portion of the back surface in FIG. 4 including side adjustment areas.

Please also refer to FIG. 6. In the embodiment, the central portion 18442 includes an original area 18442a and a side adjustment area 18442b. The side adjustment area 18442b is located between the original area 18442a and the third fringe portion 18448 and is adjacent to the original area 18442a and the third fringe portion 18448. In the horizontal direction (e.g. the direction D3), the distribution density of the reflection spots on the side adjustment area 18442b is different from the distribution density of the reflection spots on the original area 18442a, so as to reduce or eliminate a possible bluer or yellower phenomenon of the back light provided by the backlight module 18 corresponding to the portion of the window 122 of the front frame 12 close to the inner edges of the window 122. If the backlight module 18 is designed to adjust the distribution density of the reflection spots on the side adjustment area 18442b to be less than the distribution density of the reflection spots on the original area 18442a, it can reduce or eliminate a possible bluer phenomenon of the back light before the adjustment. If the backlight module 18 is designed to adjust the distribution density of the reflection spots on the side adjustment area 18442b to be greater than the distribution density of the reflection spots on the original area 18442a, it can reduce or eliminate a possible yellower phenomenon of the back light before the adjustment. As shown by FIG. 6, the side adjustment area 18442b extends along the third fringe portion 18448. The width of the side adjustment area 18442b gradually decreases in the direction from the second edge 1844b toward the first edge 1844a (i.e. equivalent to the direction D1). In practice, the profile of the side adjustment area 18442b depends on the extent of a possible bluer or yellower phenomenon of the back light provided by the backlight module 18 before the adjustments. Furthermore, in practice, the backlight module 18 is structurally symmetrical relative to the direction D1, so the central portion 18442 also includes another side adjustment area 18442c which is located between the original area 18442a and the fourth fringe portion 18450 and is adjacent to the original area 18442a and the fourth fringe portion 18450, as shown by FIG. 6. The side adjustment area 18442c and the side adjustment area 18442b are also structurally symmetrical. The relevant description of the side adjustment area 18442b also can be applied to the side adjustment area 18442c, which will not be described in addition.

Figure 7:
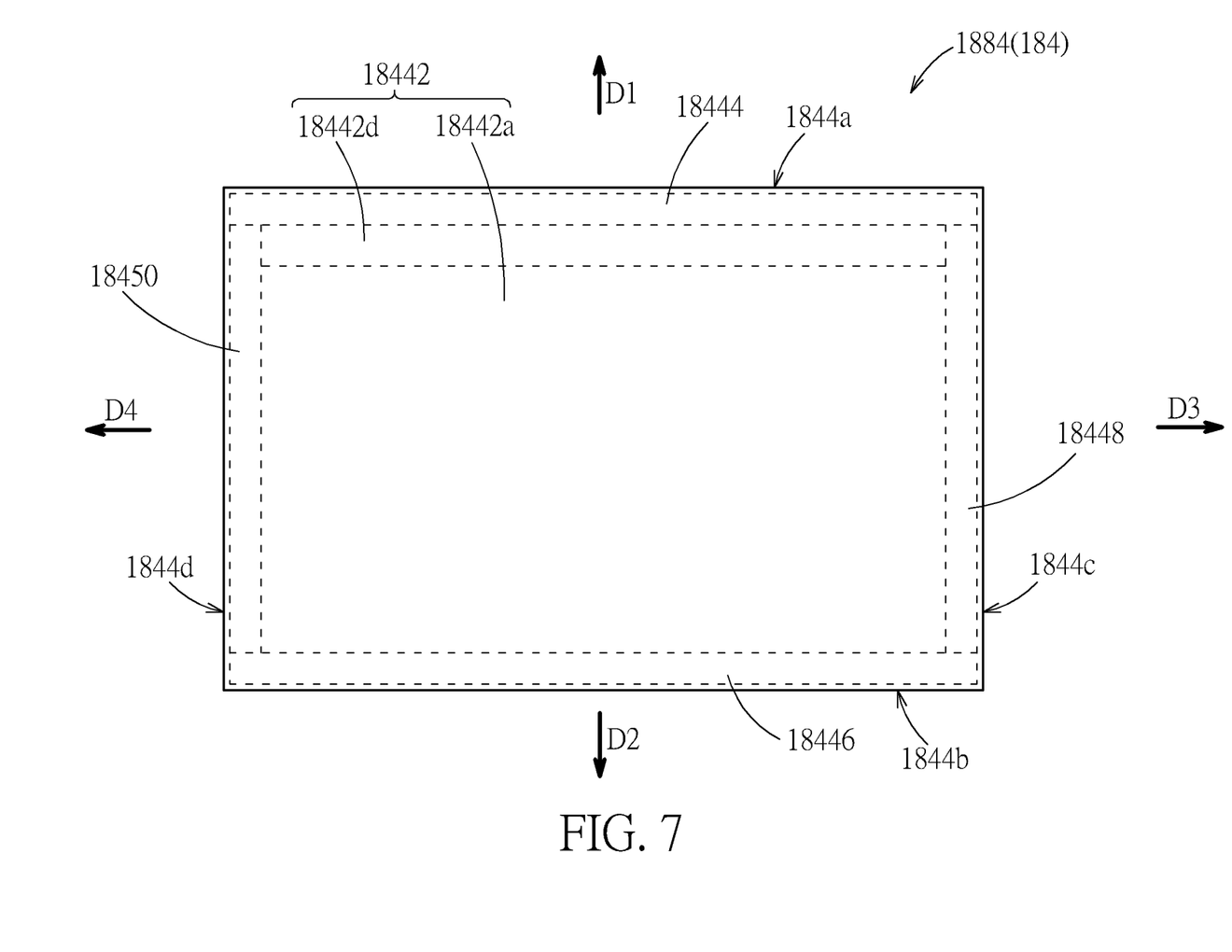
FIG. 7 is a front view of the central portion of the back surface in FIG. 4 including an upper adjustment area.
Figure 8:
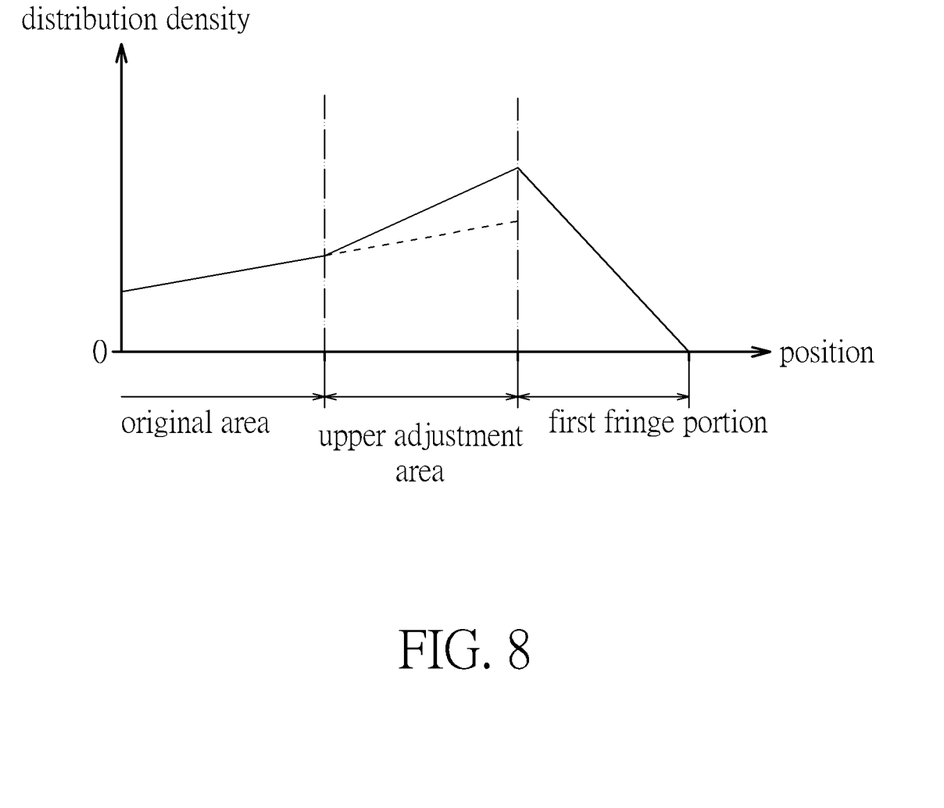
FIG. 8 is a schematic diagram illustrating the distribution density of reflection spots on an original area and the upper adjustment area.

Please also refer to FIG. 7. In the embodiment, the central portion 18442 also includes an upper adjustment area 18442d. The upper adjustment area 18442d is located between the original area 18442a and the first fringe portion 18444 and is adjacent to the original area 18442a and the first fringe portion 18444. In the vertical direction (i.e. the direction D1), the variation rate of the distribution density of the reflection spots on the upper adjustment area 18442d is greater than the variation rate of the distribution density of the reflection spots on the original area 18442a, as shown by FIG. 8; therein, for simplification of the description, the distribution densities of the reflection spots on the original area 18442a and the upper adjustment area 18442d are schematically shown in solid lines. As shown by FIG. 8, the distribution density of the reflection spots on the upper adjustment area 18442d before adjusted is schematically shown in a dashed line. The distribution density of the reflection spots on the upper adjustment area 18442d after adjusted is greater than that before adjusted, which can reduce or eliminate the possible yellower phenomenon of the back light provided by the backlight module 18 before the adjustment to the distribution density of the reflection spots on the upper adjustment area 18442d. In practice, the profile of the upper adjustment area 18442d depends on the extent of a possible yellower phenomenon of the back light provided by the backlight module 18 before the adjustment. Similarly, in practice, if the back light provided by the backlight module 18 corresponding to the upper adjustment area 18442d before the adjustment is bluer, the variation rate of the distribution density of the reflection spots on the upper adjustment area 18442d can be designed to be less than the variation rate of the distribution density of the reflection spots on the original area 18442a, so as to reduce or eliminate the bluer phenomenon of the back light provided by the backlight module 18 before the adjustment.

Although the above embodiment is based on the fact that the distribution densities of the reflection spots on the fringe portions 18444, 18446, 18448 and 18450 respectively vary, the design of the distribution densities is not limited thereto in practice. For example, according to the requirement of actual products, it is practicable to make the distribution density of the reflection spots on one or two of the fringe portions (e.g. the third fringe portion 18448 and/or the fourth fringe portion 18450) vary toward the edges 1844a-d. Furthermore, in principle, the closer to the light source 186 the portion of the back surface 1844 is, the less the quantity of the reflection spots thereon is; therefore, in practice, the distribution density of the reflection spot of the reflection spot on the second fringe portion 18446 is sparse. In this case, the back light provided by the backlight module 18 corresponding to the portion of the window 122 of the front frame 12 close to the inner edges of the window 122, and the back light close to the second fringe portion 18446 will not facilitate inducing a bluer or yellower phenomenon visible to the naked eye in principle. Therefore, in an actual product, it is practicable to dispose no reflection spots on the second fringe portion 18446.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A backlight module, comprising:
a light-guiding plate, the light-guiding plate having a light output surface, a back surface opposite to the light output surface, and a light input side surface between the light output surface and the back surface, the back surface comprising a central portion, a first fringe portion, and third fringe portion, the back surface having a first edge, a second edge opposite to the first edge, and a third edge adjacent to and between the first edge and the second edge, the first fringe portion extending along the first edge, the third fringe portion extending along the third edge, the light input side surface being adjacent to the second edge, the central portion comprising an original area and a side adjustment area, the side adjustment area being located between the original area and the third fringe portion and being adjacent to the original area and the third fringe portion;
a plurality of reflection spots, the reflection spots being distributed over the central portion, the first fringe portion, and the third fringe portion, a distribution density of the reflection spots on the first fringe portion gradually decreasing in a direction from the central portion toward the first edge, a distribution density of the reflection spots on the third fringe portion gradually decreasing in a direction from the central portion toward the third edge, a distribution density of the reflection spots on the side adjustment area being different from a distribution density of the reflection spots on the original area; and a light source, the light source being disposed toward the light input side surface.

2. The backlight module according to claim 1, wherein the back surface comprises a second fringe portion, the second fringe portion extends along the second edge, the reflection spots are distributed over the second fringe portion, and a distribution density of the reflection spots on the second fringe portion gradually decreases in a direction from the central portion toward the second edge.

3. The backlight module according to claim 1, wherein the side adjustment area extends along the third fringe portion, a width of the side adjustment area gradually decreases in a direction from the second edge toward the first edge.

4. The backlight module according to claim 1, wherein the distribution density of the reflection spots on the third fringe portion gradually increases in a direction from the second edge toward the first edge.

5. The backlight module according to claim 1, wherein the central portion comprises an upper adjustment area, the upper adjustment area is located between the original area and the first fringe portion and is adjacent to the original area and the first fringe portion, and a variation rate of a distribution density of the reflection spots on the upper adjustment area is greater than a variation rate of the distribution density of the reflection spots on the original area.

6. The backlight module according to claim 1, wherein the distribution density of the reflection spots on the side adjustment area is less than the distribution density of the reflection spots on the original area.

7. A backlight module, comprising:

a light-guiding plate, the light-guiding plate having a light output surface, a back surface opposite to the light output surface, and a light input side surface between the light output surface and the back surface, the back surface comprising a central portion and a third fringe portion, the back surface having a second edge and a third edge adjacent to the second edge, the third fringe portion extending along the third edge, the light input side surface being adjacent to the second edge, the central portion comprises an original area and a side adjustment area, the side adjustment area being located between the original area and the third fringe portion and being adjacent to the original area and the third fringe portion;

a plurality of reflection spots, the reflection spots being distributed over the central portion and the third fringe portion, a distribution density of the reflection spots on the third fringe portion gradually decreasing in a direction from the central portion toward the third edge, a distribution density of the reflection spots on the side adjustment area being less than a distribution density of the reflection spots on the original area; and a light source, the light source being disposed toward the light input side surface.

8. The backlight module according to claim 7, wherein the distribution density of the reflection spots on the third fringe portion gradually increases in a direction from the second edge toward the first edge.

9. The backlight module according to claim 7, wherein the central portion comprises a side adjustment area, the side adjustment area is located between the original area and the third fringe portion and is adjacent to the original area and the third fringe portion, and a distribution density of the reflection spots on the side adjustment area is different from a distribution density of the reflection spots on the original area.

10. The backlight module according to claim 7, wherein the back surface comprises a second fringe portion, the second fringe portion extends along the second edge, the reflection spots are distributed over the second fringe portion, and a distribution density of the reflection spots on the second fringe portion gradually decreases in a direction from the central portion toward the second edge.

11. The backlight module according to claim 7, wherein the back surface has a first edge, the third edge is adjacent to and between the first edge and the second edge, the back surface comprises a first fringe portion, the first fringe portion extends along the first edge, the reflection spots are distributed over the first fringe portion, a distribution density of the reflection spots on the first fringe portion gradually decreases in a direction from the central portion toward the first edge, and the distribution density of the reflection spots on the third fringe portion gradually increases in a direction from the second edge toward the first edge.

12. The backlight module according to claim 7, wherein the back surface comprises a second fringe portion, the second fringe portion extends along the second edge, the reflection spots are distributed over the second fringe portion, and a distribution density of the reflection spots on the second fringe portion gradually decreases in a direction from the central portion toward the second edge.

13. The backlight module according to claim 7, wherein the back surface has a first edge, the third edge is adjacent to and between the first edge and the second edge, the back surface comprises a first fringe portion, the first fringe portion extends along the first edge, the reflection spots are distributed over the first fringe portion, a distribution density of the reflection spots on the first fringe portion gradually decreases in a direction from the central portion toward the first edge, the central portion comprises an upper adjustment area, the upper adjustment area is located between the original area and the first fringe portion and is adjacent to the original area and the first fringe portion, and a variation rate of a distribution density of the reflection spots on the upper adjustment area is greater than a variation rate of a distribution density of the reflection spots on the original area.

14. The backlight module according to claim 7, wherein the back surface has a first edge, the third edge is adjacent to and between the first edge and the second edge, the side adjustment area extends along the third fringe portion, a width of the side adjustment area gradually decreases in a direction from the second edge toward the first edge.

15. A backlight module, comprising:

a light-guiding plate, the light-guiding plate having a light output surface, a back surface opposite to the light output surface, and a light input side surface between the light output surface and the back surface, the back surface comprising a central portion, a first fringe portion, and a third fringe portion, the back surface having a first edge, a second edge, and a third edge adjacent to and between the first edge and the second edge, the first fringe portion extending along the first edge, the third fringe portion extending along the third edge, the light input side surface being adjacent to the second edge, the central portion comprising an original area and an upper adjustment area, the upper adjustment area being located between the original area and the first fringe portion and being adjacent to the original area and the first fringe portion;
a plurality of reflection spots, the reflection spots being distributed over the central portion, the first fringe portion, and the third fringe portion, a distribution density of the reflection spots on the first fringe portion gradually decreasing in a direction from the central portion toward the first edge, a distribution density of the reflection spots on the third fringe portion gradually decreasing in a direction from the central portion toward the third edge, a variation rate of a distribution density of the reflection spots on the upper adjustment area being greater than a variation rate of a distribution density of the reflection spots on the original area; and
a light source, the light source being disposed toward the light input side surface.

16. A backlight module, comprising:
a light-guiding plate, the light-guiding plate having a light output surface, a back surface opposite to the light output surface, and a light input side surface between the light output surface and the back surface, the back surface comprising a central portion and a first fringe portion, the back surface having a first edge and a second edge opposite to the first edge, the first fringe portion extending along the first edge, the light input side surface being adjacent to the second edge;
a plurality of reflection spots, the reflection spots being distributed over the central portion and the first fringe portion, a distribution density of the reflection spots on the first fringe portion gradually decreasing in a direction from the central portion toward the first edge, the central portion comprising an original area and an upper adjustment area, the upper adjustment area being located between the original area and the first fringe portion and being adjacent to the original area and the first fringe portion, a variation rate of a distribution density of the reflection spots on the upper adjustment area being greater than a variation rate of a distribution density of the reflection spots on the original area; and
a light source, the light source being disposed toward the light input side surface.

17. The backlight module according to claim 16, wherein the back surface comprises a second fringe portion, the second fringe portion extends along the second edge, the reflection spots are distributed over the second fringe portion, and a distribution density of the reflection spots on the second fringe portion gradually decreases in a direction from the central portion toward the second edge.

18. The backlight module according to claim 16, wherein the back surface has a third edge, the third edge is adjacent to and between the first edge and the second edge, the back surface comprises a third fringe portion, the third fringe portion extends along the third edge, the reflection spots are distributed over the third fringe portion, and a distribution density of the reflection spots on the third fringe portion gradually decreases in a direction from the central portion toward the third edge.

19. The backlight module according to claim 18, wherein the distribution density of the reflection spots on the third fringe portion gradually increases in a direction from the second edge toward the first edge.

20. The backlight module according to claim 18, wherein the central portion comprises a side adjustment area, the side adjustment area is located between the original area and the third fringe portion and is adjacent to the original area and the third fringe portion, and a distribution density of the reflection spots on the side adjustment area is less than the distribution density of the reflection spots on the original area.

21. The backlight module according to claim 18, wherein the central portion comprises a side adjustment area, the side adjustment area is located between the original area and the third fringe portion and is adjacent to the original area and the third fringe portion, a distribution density of the reflection spots on the side adjustment area is different from the distribution density of the reflection spots on the original area, the side adjustment area extends along the third fringe portion, and a width of the side adjustment area gradually decreases in a direction from the second edge toward the first edge.

22. A backlight module, comprising:
a light-guiding plate, the light-guiding plate having a light output surface, a back surface opposite to the light output surface, and a light input side surface between the light output surface and the back surface, the back surface comprising a central portion and a third fringe portion, the back surface having a first edge, a second edge, and a third edge adjacent to and between the first edge and the second edge, the third fringe portion extending along the third edge, the light input side surface being adjacent to the second edge, the central portion comprises an original area and a side adjustment area, the side adjustment area being located between the original area and the third fringe portion and being adjacent to the original area and the third fringe portion, the side adjustment area extending along the third fringe portion, a width of the side adjustment area gradually decreasing in a direction from the second edge toward the first edge;
a plurality of reflection spots, the reflection spots being distributed over the central portion and the third fringe portion, a distribution density of the reflection spots on the third fringe portion gradually decreasing in a direction from the central portion toward the third edge, a distribution density of the reflection spots on the side adjustment area being different from a distribution density of the reflection spots on the original area; and
a light source, the light source being disposed toward the light input side surface.

23. The backlight module according to claim 22, wherein the back surface comprises a second fringe portion, the second fringe portion extends along the second edge, the reflection spots are distributed over the second fringe portion, and a distribution density of the reflection spots on the second fringe portion gradually decreases in a direction from the central portion toward the second edge.

24. The backlight module according to claim 22, wherein the third edge is adjacent to and between the first edge and the second edge, the back surface comprises a first fringe portion, the first fringe portion extends along the first edge, the reflection spots are distributed over the first fringe portion, a distribution density of the reflection spots on the first fringe portion gradually decreases in a direction from the central portion toward the first edge, and the distribution density of the reflection spots on the third fringe portion gradually increases in a direction from the second edge toward the first edge.

25. The backlight module according to claim 22, wherein the third edge is adjacent to and between the first edge and the second edge, the back surface comprises a first fringe portion, the first fringe portion extends along the first edge, the reflection spots are distributed over the first fringe portion, a distribution density of the reflection spots on the first fringe portion gradually decreases in a direction from the central portion toward the first edge, the central portion comprises an upper adjustment area, the upper adjustment area is located between the original area and the first fringe portion and is adjacent to the original area and the first fringe portion, and a variation rate of a distribution density of the reflection spots on the upper adjustment area is greater than a variation rate of a distribution density of the reflection spots on the original area.

* * * * *